United States Patent [19]

Martin et al.

[11] Patent Number: 4,876,987

[45] Date of Patent: Oct. 31, 1989

[54] SYNTHETIC GAS COOLER WITH THERMAL PROTECTION

[75] Inventors: Michael C. Martin; Beth E. McCracken; George M. Gulko, all of Houston, Tex.

[73] Assignee: Texaco, Inc., White Plains, N.Y.

[21] Appl. No.: 211,934

[22] Filed: Jun. 27, 1988

[51] Int. Cl.⁴ .............................................. F22B 37/38
[52] U.S. Cl. .................. 122/504.2; 122/7 R; 165/11.1
[58] Field of Search ............... 165/11.1, 119; 137/557; 122/7 R, 504.2

[56] References Cited

U.S. PATENT DOCUMENTS

| | | | |
|---|---|---|---|
| 4,090,554 | 5/1978 | Dickinson | 165/1 |
| 4,197,868 | 4/1980 | Carson | 137/7 |
| 4,293,853 | 10/1981 | Kubota | 340/611 |
| 4,377,132 | 3/1983 | Koog et al. | 122/7 R |

Primary Examiner—Martin P. Schwadron
Assistant Examiner—Allen J. Flanigan
Attorney, Agent, or Firm—Robert A. Kulason; James J. O'Loughlin; Robert B. Burns

[57] ABSTRACT

In a heat exchange vessel which conducts a hot, pressurized synthetic gaseous stream carrying particulate matter through a central heat exchange chamber, a safety system for monitoring pressures within the vessel. Said heat exchange vessel includes a shell surrounding a water wall, defining an annulus therebetween. Pressure sensing means communicated with the respective heat exchange chamber and said annulus connects to means for determining the pressure differential between said points. A purge gas source communicated with the monitor system maintains the latter free of internal passage blockage caused by accumulations of particulate matter.

7 Claims, 2 Drawing Sheets

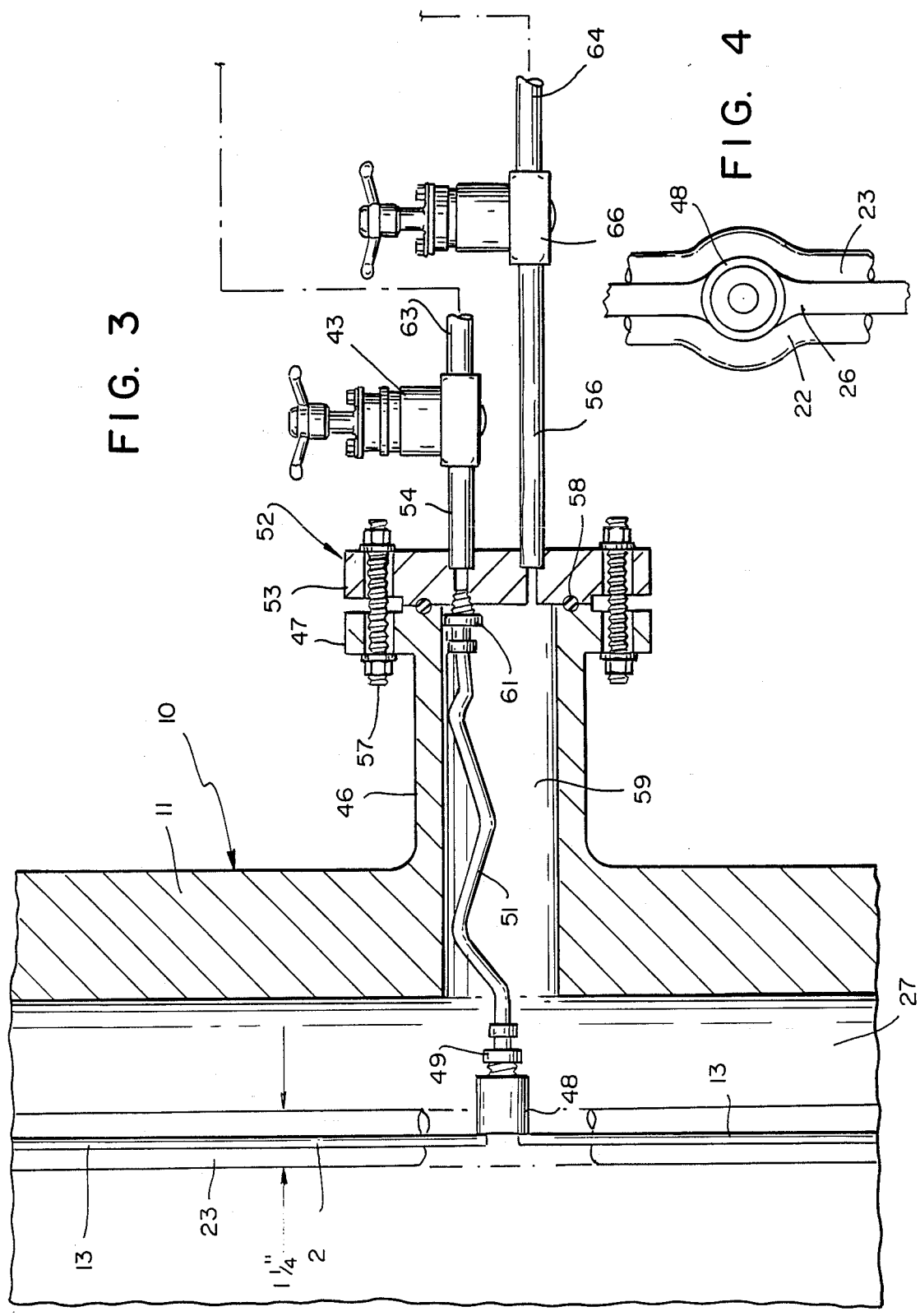

SYNTHETIC GAS COOLER WITH THERMAL PROTECTION

BACKGROUND OF THE INVENTION

1. Field of the Invention

This invention relates in general to a heat exchanger structure and, more particularly to a synthetic gas cooling apparatus or waste heat boiler which is provided with thermal protection means to avoid inadvertent operational damage. The hot gas producing process utilizes a fuel comprised of finely ground coal, coke, or even a liquid fuel which is combusted in a controlled atmosphere. The resulting effluent thus includes not only synthesis gas, but also an amount of dust or fly ash.

2. Description of the Prior Art

There are numerous heat exchanger designs such as waste heat boiler structures employed in different environments and for different applications. The cooling of hot synthesis gas from a gasifier, and the finely divided solids such as powdered fly ash or slag, has heretofore utilized radiation boilers which raise steam in water wall tubes. With such a boiler or heat exchanger, the solidified slag and cooled synthetic gas, are removed at the bottom of a downflow radiation boiler. In commercial size plants, however, the radiation boiler dimensions could become a limiting factor where a single, entrained throughput flow of the hot synthesis gas is employed.

It is further noted that various structures for heat exchangers such as radiant waste heat boilers, are utilized for transferring heat from the flow of hot gas that is to be cooled. Many of these structures are not readily adapted to large scale flow of synthesis gas. Also, there are known waste heat boilers that are characterized by a relatively complex structure; one such is described in U.S. Pat. No. 4,377,132.

Such structures, because of the excessive heat conditions under which they operate, are susceptible to damage in the event of some minor equipment malfunction. Further, the process might take a step not accounted for as a result of the presence of the solid segment of the hot produced gas.

It is therefor an object of the invention to provide a synthesis gas cooler structure that is adapted for safely conducting a high temperature, particle laden gaseous stream. A further object is to provide a unit of the type contemplated which can function without damage under operating conditions including a high temperature environment, in which a large amount of solids is carried in the hot gaseous stream.

It is a further object to provide a heat exchanger that will require a relatively brief shut down period for effecting internal replacements of parts.

SUMMARY OF THE INVENTION

Briefly, the invention concerns a synthesis gas cooler such as a waste heat boiler, that is comprised of an outer shell having an inlet at one end of the shell for receiving a stream of the synthesis gas with entrained solids. It further comprises a water wall spaced inwardly of the shell for radiation heat exchange from the hot synthesis gas, to the liquid carried or circulated in the water wall. The water wall forms an annulus or elongated annular chamber with the outer shell. The invention further comprises means for monitoring the differential pressure across the water wall within a heat exchanger of the type contemplated. The function of the monitoring means is to detect the onset of a harmful build-up of slag particles which could create a potentially damaging situation.

Stated otherwise, the invention is concerned with a synthesis gas cooler and waste heat boiler. The unit comprises a vertical outer shell having an axial inlet at the top for introducing hot synthesis gas, together with entrained solids. An inner water wall extends coaxial with said shell defining a central heat exchange passage.

The water wall in one embodiment comprises a series of parallel, circularly arranged tubes for radiant heat exchange from hot synthesis gas. The water wall defines an annulus or elongated annular chamber with the outer shell. Manifold means connects with the respective parallel tubes at the top and the bottom of the latter. The tubes are communicated with a water source for circulation through the water wall, which is in turn communicated with a steam drum.

A warning or monitor system includes sensor means communicating the pressures in the central gas passage and in the annulus chamber, to a differential pressure analyzer. The latter will afford a means for warning an operator of an excessive build-up of differential pressure across the water wall.

Typically, water walls are designed to withstand a design value of about 10 psi of differential pressure at normal process and steam-side conditions. Differential pressures in excess of the design value can result in catastrophic failures of the vessel shell due to exposure to hot gases.

BRIEF DESCRIPTION OF THE DRAWINGS

FIG. 3 is an enlarged cross-sectional representation taken along line 3—3.

FIG. 4 is an enlarged cross-sectional view taken along line 4—4 of FIG. 1.

DESCRIPTION OF THE PREFERRED EMBODIMENT

In connection with manufacturing of synthesis gas from powdered coal, coke and the like, the necessity always exists for cooling the hot produced gas. Normally, this phase of the operation is achieved in a gas cooler of some form. For economy, the heat can be removed in a radiation boiler such that steam is generated in water wall tubes of the boiler structure. Solidified slag from entrained solids carried with the hot synthesis gas is normally removed at the bottom of the boiler.

For a commercial size plant, the quantity of synthesis gas flow is such that the dimensions of this type of radiation boiler could be a limiting factor. In any event, in view of the varying sizes and weights of the solid, particulated segment in the synthesis gas, the solids will not all be removed in the cooler. Steps must therefore be taken to prevent the solids from accumulating in the apparatus at critical points. Such accumulations, if not prevented, could be to an extent as to cause thermal damage or other malfunction.

Figure 2:
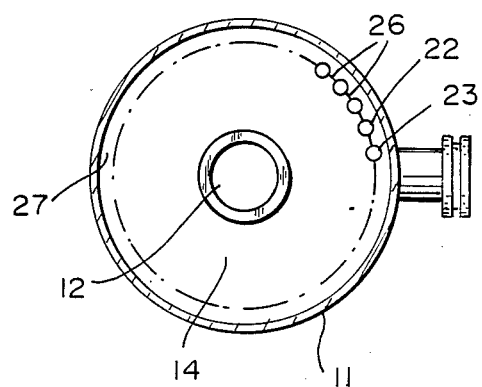
FIG. 2 is a cross-sectional view taken along line 2—2 in FIG. 1.

It will be understood that the term "water wall" as used herein, has an accepted meaning to one skilled in the relevant art. More specifically, a water wall structure is such that a plurality of tubular passages are provided for holding or circulating a fluid which is to receive exchange heat. The usual water wall structure is utilized in applicant's cylindrical heat exchanger unit. As shown in FIG. 2, the water wall is constructed with parallel water tubes 22 and 23 having intermediate fins 24 and 26, or other means which join the tube walls into a single, cylindrical gas tight surface.

The tubes as noted above, are normally arranged in parallel, and connected at their respective ends by circular manifolds to provide a common passage for the fluid into, and for steam out of, the respective tubes.

Figure 1:
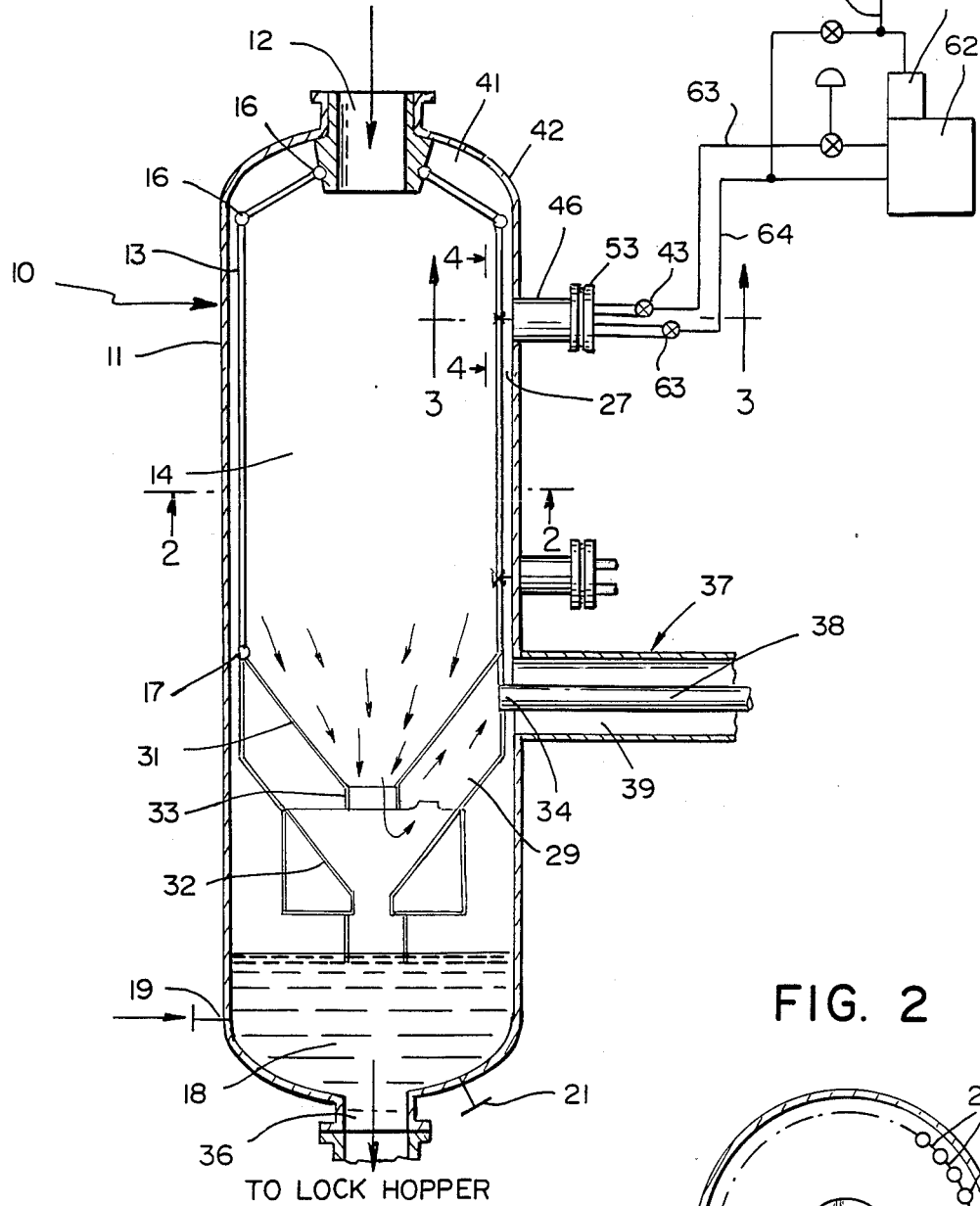
FIG. 1 is an elevation view in cross-section of a heat exchanger of the type contemplated, together with a schematic representation of the differential pressure warning system.

Referring to FIGS. 1 and 2, a radiant heat gas cooler or heat exchanger 10 according to the invention, includes an elongated, upright shell 11 having an inlet 12 axially situated at the shell upper end. A water wall 13 spaced inwardly of shell 11 provides for radiation heat exchange from hot synthesis gas with entrained solids, which flows down the central passage 14.

Water wall 13 is constructed with manifolds 16 and 17 at the top and the bottom respectively of tubes 22 and 23 which form the wall, and define central cooling passage 14. This conventional tubular structure is employed so that the circulating fluid, in this instance water, can be circulated and retrieved as usable steam. Water wall 13, positioned coaxial with shell 11, defines an annulus or elongated annular chamber 27 between the two adjacent surfaces.

At the lower end of shell 11 a bath 18 or body of water functions to receive and quench solids entrained in the hot synthesis gas as the latter flows axially down center passage 14. It will be understood that the water is retained within the shell lower end or bath by a lockhopper or similar structure connected thereto. Some circulation of water into and out of bath 18 can be maintained by way of inlet 19 and outlet 21 means, which are schematically shown.

The lower end of the water wall 13 is provided with at least one, and preferably with a plurality of necked down segments 31 and 32 which function to progressively narrow the hot gaseous stream, into a rapidly moving stream.

After the particle carrying synthesis gas has been sufficiently cooled by contact with the water wall surface, the gas will enter constricted neck 33 and be urged into a reverse flow. It is then directed upwardly to discharge port 34 formed into a side of shell 11.

The first or initial necked down section 31 of central passage 14 is positioned at the lower end of the water wall 13 and is comprised basically of a frusto conical member that terminates in constricted neck or opening 33. As the rapidly flowing gas passes through the constricted neck its velocity will substantially increase. Thus, heavier solid particles will be carried by momentum toward the water bath 18. The gaseous component of the stream on the other hand will continue its reversal of flow and be carried toward discharge port 34 by way of annular passage 29.

In the second constricted segment 32, the larger solids and particulates will be directed into water bath 18. The solids will fall to the lockhopper by way of drain port 36.

With respect to the cooled and substantially particle-free gas, it can be appreciated that a portion of the solid particles will be of a size and weight as to be unaffected by the reverse flow of the gas. These particles are found to be generally less than five microns in diameter. They will consequently pass into the discharge port 34 and its connecting cross-over conduit 37. Over a period of time these particles, some of which contact the cross-over conduit walls, will tend to cling to the latter. Under certain conditions the particles will accumulate and eventually build up to constitute a substantial blockage of the conduit main passage 38.

To avoid the possible complete stoppage of gaseous flow through cross-over conduit 37, the latter is provided with a bypass channel 39. When the gaseous flow cannot be accommodated, or is blocked in the central passage 38, it will be diverted to flow through the secondary or bypass opening 39 and proceed to downstream equipment where the gas is further treated.

Toward maintaining a condition of equilibrium or pressure balance across water wall 13, annulus 27 between said water wall, and the inner surface of shell 11, is in effect communicated with the pressure within central passage 14. This arrangement will ordinarily assure that no appreciable pressure difference will occur across water wall 13.

In the event a pressure difference develops such that the pressure in annulus 27 either falls off or increases, water wall 13 could undergo damage which allows leakage points to form. This would normally result from the wall being expanded or deformed. Also, connecting fins 26, or the connecting seams therebetween, could be sufficiently damaged to allow the hot gas to enter annulus 27 and thereafter rise to interspace 41 beneath the unit's cap 42.

Referring to FIG. 3, the safety or monitor system which is incorporated into the disclosed heat exchanger or radiant cooler, can best be interposed at a plurality of points and more preferably at three or more points. Thus, any pressure differential which develops between central passage 14 and annulus 27, can be rapidly determined and acted on simultaneously.

At one such point and as shown in FIG. 3, a housing 46 is communicated with annulus 27, and includes a connecting flange 47 at the outer extremity. A pressure sensing receptacle tap formed into water wall 13, is comprised of a cylindrical fitting 48 which has an open end communicated with central passage 14. The other or interior end of fitting 48 is threaded to removably receive a gas tight fitting 49. Cylindrical fitting 48 is placed between two adjacent boiler tubes 22 and 23 in a manner to prevent it from being thermally damaged by exposure to the hot gases in central heat exchange chamber 14.

A first pressure sensing tap includes a length of pipe, tubing, or preferably flexible metallic tubing 51. The tubing is conformed, and provided with excess length to allow for thermally induced differential movement between the shell 11 and the water wall 13.

A pressure monitor unit assembly 52 is comprised of a base member 53 in the form of a mounting flange having through openings which receive tubing members 54 and 56. Connecting bolts 57 permit the adjacent flanges to be drawn into gas tight direct contact against a thermally resistant, sealing gasket 58 compressed therebetween, thereby assuring gas tight integrity of the joint. Second tubing conductor or conduit 56 is positioned in base 53 and opens directly into inner passage 59 of housing 46. First tubing conduits 54 communicate with gas tight connector 61 at the remote end of sensing conduit 51 and opens into heat exchange chamber 14.

First tubing conductor 54 includes a shut-off valve 43, which is communicated, together with second conduit 56, into pressure differential analyzer 62 by way of lines 63 and 64, respectively. Second tubing conductor 56 further includes a shut-off valve 66.

The disclosed safety system is designed to, and functions to monitor differential pressures across water wall 13 in the heat exchanger unit 10 as a factor toward avoiding damage thereto. By monitoring the differential pressures at specified points in the unit, any differential detected, will initiate a warning of an impending problem. Although only one is shown, each of the plurality of pressure sensing taps is therefore communicated to the common differential pressure analyzer 62. The latter thus embodies a suitable warning feature, whether available or visible, to provide the necessary indication of a pressure differential build-up beyond a pre-set allowable range or level.

Differential pressure analyzers of the type here contemplated are used commercially in varying applications. Functionally, such an instrument is capable of receiving pressure reading from at least two different sources. These pressures when applied to a diaphragm or similar operable mechanism, will furnish a desired indication of the pressure differentials which exist between the two sources.

Since the hot synthesis gas will always retain some entrained particulate matter, depending on fuel composition, the latter will always pose a prospective source of operating difficulty. The synthesis gas also carries corrodents or corrosive elements which can condense on exposed surfaces of the instrumentation and the differential pressure monitoring system.

The condensation, if not checked, will result in corrosion of these parts and ultimately result in the generation of erroneous readings. It is necessary therefore that the solid medium carried on the hot gas stream be disposed of before it can accumulate into a blockage in one or more of the smaller conduits.

First tubing conductor 54 is thus communicated through valve 43 and conduit 63 with a pressurized source 67 of a purge gas such as nitrogen, by way of valved conduit 68. Nitrogen, passed through a timer apparatus 44 which, when metered into the safety system, provides a periodic high pressure purging step. Said purging step functions to maintain the various lines and apparatus clear of obstructions, on a continuing, as well as on a periodic, basis.

To avoid corrosive damage to outer surfaces of conduit 51, a slow, continuous flow of purge gas from source 67, is introduced by way of line 64, valve 66 and line 56, to enter and fill passage 59 with a non-corrosive atmosphere. The rate of the slow continuous nitrogen purge is adjusted at valve 72 such that it will not appreciably affect differential pressure readings at 62. The rapid periodic purge on any one of the plurality of pressure sensing housings 46, is timed at timer 44 and by adjustment of valve 72 such that the non-purged housings will be in a pressure indicating mode and not being purged during the rapid periodic purge.

To automate the procedure, instrumentation such as a programmable logic controller or a similar apparatus, is used to regulate the sequencing of the fast gas purges. Said apparatus will further cause the signal from any individual housing to be discontinued during a rapid periodic purge.

Preferably, entering purge gas is heated in an external heat exchanger, prior to injection. Thus, the surface of sensing conduit 51 is continuously maintained above the dew point of gas in annulus 27. This practice serves to prevent pitting of the external surface of sensing conduit 51. Pitting, or a similar action on this surface could ultimately lead to erroneous readings from the monitoring system.

As described above, the purging of second tubing conductor 56 prevents solids from forming blockages, and corrodents from damaging the differential pressure instrumentation. The purge gas further acts to reduce the concentration of water vapor and corrodents in the region surrounding sensing conduit 51. This action thereby reduces the dew point of the surrounding gas and prevents failure of the sensing conduit 51 as a result of corrosion.

It is understood that although modifications and variations of the invention can be made without departing from the spirit and scope thereof, only such limitations should be imposed as are indicated in the appended claims.

We claim:

1. In a heat exchange apparatus for treating a stream of a hot, particulate carrying gas, said apparatus including:
    an elongated shell having an inlet port for receiving said hot particulate carrying gas, and having an outlet port for discharging cooled, substantially particle free gas,
    a water wall positioned in said elongated shell defining a heat exchange chamber having a downstream end and being spaced from said shell to form an annular passage,
    passage means communicating said inlet port with said heat exchange chamber to introduce hot, particulate carrying gas to the latter, and
    cross passage means communicating the heat exchange chamber downstream end with said discharge port and with said annular passage, respectively, the improvement therein of
    a pressure monitoring system associated with said heat exchange apparatus and including
    means forming a gas pressure differential indicator,
    first conduit means communicating said heat exchange chamber with said gas pressure differential indicator and
    second conduit means communicating said annular passage with said gas pressure differential indicator.

2. In the apparatus as defined in claim 1, including a pressurized source holding a purge gas, and means communicating said pressurized purge gas source with said first conduit means.

3. In the apparatus as defined in claim 2, including means communicating said pressurized source of purge gas with said second conduit means.

4. In the apparatus as defined in claim 2, including means for regulating the flow of purge gas which enters said first conduit.

5. In the apparatus as defined in claim 3, including means for regulating the flow of purge gas which enters said second conduit.

6. In the apparatus as defined in claim 4, wherein said means for regulating the flow of purge gas is automatically operable to periodically introduce a pressurized flow of purge gas into said first conduit.

7. In the apparatus as defined in claim 2, wherein said pressurized source of purge gas is maintained at a pressure in excess of the pressure in said heat exchange chamber.

* * * * *